(12) United States Patent
Agrawal et al.

(10) Patent No.: US 8,548,943 B2
(45) Date of Patent: Oct. 1, 2013

(54) SYSTEMS AND METHODS FOR CONTINUOUS PIM SYNCHRONIZATION BETWEEN A HOST COMPUTER AND A CLIENT HANDHELD DEVICE

(75) Inventors: Anish Agrawal, Kanata (CA); Zhigang Ruan, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1670 days.

(21) Appl. No.: 11/317,216

(22) Filed: Dec. 22, 2005

(65) Prior Publication Data

US 2006/0218224 A1    Sep. 28, 2006

Related U.S. Application Data

(60) Provisional application No. 60/639,053, filed on Dec. 23, 2004.

(51) Int. Cl.
*G06F 7/00* (2006.01)
*G06F 17/00* (2006.01)

(52) U.S. Cl.
USPC ............ 707/611; 707/613; 707/617; 707/621

(58) Field of Classification Search
None
See application file for complete search history.

(56) References Cited

U.S. PATENT DOCUMENTS

| | | | |
|---|---|---|---|
| 5,752,042 A | 5/1998 | Cole et al. | |
| 5,758,355 A | 5/1998 | Buchanan | |
| 5,790,974 A | 8/1998 | Tognazzini | |
| 5,926,816 A * | 7/1999 | Bauer et al. | 1/1 |
| 5,974,238 A | 10/1999 | Chase, Jr. | |
| 6,006,274 A | 12/1999 | Hawkins et al. | |
| 6,034,621 A | 3/2000 | Kaufman | |
| 6,125,369 A | 9/2000 | Wu et al. | |
| 6,295,541 B1 | 9/2001 | Bodnar et al. | |
| 6,341,316 B1 | 1/2002 | Kloba et al. | |
| 6,601,076 B1 | 7/2003 | McCaw et al. | |
| 6,611,849 B1 * | 8/2003 | Raff et al. | 1/1 |
| 6,615,246 B2 * | 9/2003 | Pivowar et al. | 709/214 |
| 6,650,088 B1 | 11/2003 | Webb et al. | |

(Continued)

FOREIGN PATENT DOCUMENTS

EP    0 917 077 A2    5/1999
WO    02/19181 A2    3/2002

(Continued)

OTHER PUBLICATIONS

Phillip A. Laplante, Dictionary of Computer Science Engieering and Technology, 2001, CRC Press LLC, 1, 118.*

(Continued)

*Primary Examiner* — Shew-Fen Lin
*Assistant Examiner* — Jermaine Mincey
(74) *Attorney, Agent, or Firm* — The Danamraj Law Group, P.C.

(57) ABSTRACT

A wireless handheld device operable to continuously synchronize PIM information with a host desktop computer. The device comprises a software module for updating a handheld PIM database to reflect a change to PIM information, a software module for updating a handheld mirror database to reflect the change to PIM information, a software module for generating a PIM message relating to the change to the PIM information, a software module for translating the PIM message from a handheld data format into a network data format and a software module for sending the PIM message from the client wireless handheld device to the host desktop computer via a wireless network.

20 Claims, 5 Drawing Sheets

(56) References Cited

U.S. PATENT DOCUMENTS

| | | | |
|---|---|---|---|
| 6,671,757 | B1 | 12/2003 | Multer et al. |
| 6,757,696 | B2 | 6/2004 | Multer et al. |
| 6,791,996 | B1* | 9/2004 | Watanabe et al. ............. 370/447 |
| 2001/0011308 | A1 | 8/2001 | Clark et al. |
| 2001/0054115 | A1* | 12/2001 | Ferguson et al. ............. 709/248 |
| 2002/0032722 | A1 | 3/2002 | Baynes, Jr. et al. |
| 2002/0116499 | A1* | 8/2002 | Enns et al. .................... 709/227 |
| 2002/0194207 | A1 | 12/2002 | Bartlett et al. |
| 2003/0061433 | A1 | 3/2003 | Hall et al. |
| 2003/0130984 | A1 | 7/2003 | Quinlan et al. |
| 2003/0182391 | A1* | 9/2003 | Leber et al. ................... 709/217 |
| 2004/0010523 | A1 | 1/2004 | Wu et al. |
| 2004/0024795 | A1* | 2/2004 | Hind et al. .................... 707/204 |
| 2004/0030721 | A1* | 2/2004 | Kruger et al. ............. 707/104.1 |
| 2005/0065995 | A1* | 3/2005 | Milstein et al. ............... 709/202 |
| 2006/0095525 | A1* | 5/2006 | Mousseau et al. ............ 709/206 |
| 2006/0095859 | A1* | 5/2006 | Bocking et al. ............... 715/764 |
| 2006/0106881 | A1* | 5/2006 | Leung et al. .................. 707/200 |
| 2006/0106937 | A1* | 5/2006 | Shields et al. ................ 709/228 |

FOREIGN PATENT DOCUMENTS

| | | |
|---|---|---|
| WO | 02/23330 | 3/2002 |
| WO | WO 02/080015 A1 | 10/2002 |
| WO | WO 2005/036365 A2 | 4/2005 |

OTHER PUBLICATIONS

Yutaka Ishibashi; Joint Synchronization between Live and Stored Media in Multicast Communications 2000;IEEE; pp. 330-336.*

PCT International Preliminary Report on Patentability: Jul. 5, 2007; 9 pages.

European Search Report; European Patent Office; Dec. 20, 2007; 7 pages.

State Intellectual Property of the People's republic of China Office Action Application No. 200580043727.7; Dec. 12, 2008; 8 pages.

International Search Report and Written Opinion of the International Searching Authority; PCT Office; 12 pages.

EPO Examination Report; Application No. 05 845 631.0-1244; European Patent Office; Jun. 24, 2009; 7 pages.

State Intellectual Property Office; Second Office Action; Application 20050053727.7; People's Republic of China; Jul. 31, 2009; 19 pages.

SIPO, Rejection Decision, Application No. 200580043727.7, Jun. 10, 2011, 7 pgs.

Canadian Office Action; Application No. 2,594,100; Canadian Intellectual Property Office; Mar. 11, 2010, 3 pages.

CA Office Action, Application No. 2594100, Canadian IPO, Mar. 3, 2011, 3 pgs.

CIPO, Notice of Allowance, Application No. 2594100, Apr. 10, 2012, 1 pg.

EPO, Decision to Grant a European Patent Pursuant to Article 97(1) EPC, Application No. 05845631.0, Nov. 25, 2010, 1 pg.

CIPO, Office Action, Application No. 2,522,477, Aug. 12, 2009, 7 pgs.

CIPO, Office Action, Application No. 2,522,477, Jul. 16, 2010, 2 pgs.

CIPO, Notice of Allowance, Application No. 2,522,477, Apr. 15, 2011, 1 pg.

EPO, European Search Report, Application No. 04256533.3, Mar. 17, 2005, 7 pgs.

EPO, Communication Pursuant to Article 96(2) EPC, Application No. 04256533.3, Feb. 16, 2007 4 pgs.

EPO, Communication under Rule 51(4) EPC, Application No. 04256533.3, Aug. 30, 2007, 31 pgs.

EPO, Decision to Grant a European Patent Pursuant to Article 97(1) EPC, Application No. 04256533.3, Jan. 24, 2008, 1 pg.

IP India, Patent Application Publication, Application No. 2655/DEL/2005, Oct. 2, 2009, 1 pg.

SIPO, First Office Action, Application No. 200510114082.3, Jul. 4, 2008, 4 pgs.

SIPO, Second Office Action, Application No. 200510114082.3, Feb. 5, 2010, 2 pgs.

SIPO, Notification of Grant, Application No. 200510114082.3, Apr. 2, 2011, 2 pgs.

SIPO, Reexamination Office Action, Application No. 200580043727.7, Feb. 16, 2013, 11 pgs.

USPTO, Office Action, U.S. Appl. No. 10/971,321, filed Jun. 14, 2007, 16 pgs.

USPTO, Office Action, U.S. Appl. No. 10/971,321, filed Nov. 26, 2007, 17 pgs.

USPTO, Examiner's Answer, U.S. Appl. No. 10/971,321, filed Aug. 1, 2008, 19 pgs.

USPTO, Decision on Appeal, U.S. Appl. No. 10/971,321, filed Jun. 22, 2010, 9 pgs.

USPTO, Notice of Allowance, U.S. Appl. No. 10/971,321, filed Jul. 20, 2010, 8 pgs.

* cited by examiner

SYSTEMS AND METHODS FOR CONTINUOUS PIM SYNCHRONIZATION BETWEEN A HOST COMPUTER AND A CLIENT HANDHELD DEVICE

CROSS-REFERENCE TO RELATED APPLICATIONS

The present application claims priority to U.S. Provisional Patent Application Ser. No. 60/639,053 filed Dec. 23, 2004.

TECHNICAL FIELD

The present application relates, in general, to personal information management (PIM) applications in a wireless network, and in particular, to systems and methods for implementing continuous synchronization of PIM applications between a host desktop computer and a client handheld device.

BACKGROUND

Many wireless handheld devices in wireless networks may implement PIM applications and provide personal information services such as calendar, contacts, tasks, memos or the like. Some of these wireless handheld devices are capable of wireless synchronization with the desktop computer, that is, information is transferred between the desktop computer and the handheld device to update each. However, these wireless handheld devices usually utilize a pull based technique where the synchronization only happen on a periodic basis. For example, a user may configure to make synchronization happen every 10 minutes, and the wireless handheld device asks server to send all the accumulated changes since the last synchronization event.

Many wireless handheld devices are not capable of continuous synchronization to update the information stored on the desktop computer when changes are made to the personal information stored on the handheld device or update the information stored on the handheld device when changes are made to the personal information stored on the desktop computer. A need has arisen for systems and methods for implementing continuous synchronization of PIM applications between a desktop computer and a handheld device.

DETAILED DESCRIPTION

Generally speaking, the present application utilizes push based wireless transport architecture to implement continuous synchronization of PIM applications between a host desktop computer and a client wireless handheld device. Whenever there is a change in PIM applications such as calendar, in the handheld device, the architecture automatically pushes the change to the desktop computer to synchronize the desktop computer with the handheld device immediately. Similarly, whenever there is a change in PIM applications such as calendar in the desktop computer, the change is automatically pushed to the handheld device to immediately update the PIM application such as calendar information.

According to a first aspect, the present disclosure relates to a method for implementing continuous synchronization of personal information management (PIM) applications from a host desktop computer having a desktop PIM database to a client wireless handheld device having a handheld PIM database. The method includes the steps of generating a PIM message at the host desktop computer whenever there is a change in the desktop PIM database, sending the PIM message from the host desktop computer to the client wireless handheld device via a wireless network, determining the type of the PIM message and storing the PIM message in a handheld PIM database and in a handheld mirror database if the PIM message is a non-email message.

According to a second aspect, the present disclosure relates to a wireless handheld device operable to continuously synchronize PIM information with a host desktop computer. The device comprises means for updating a handheld PIM database to reflect a change to PIM information, means for updating a handheld mirror database to reflect the change to PIM information, means for generating an email message, means for attaching to the new email the change to the PIM information, means for translating the change to the PIM information from a handheld data format into a network data format and means for sending the email message from the client wireless handheld device to the host desktop computer via a wireless network.

According to a third aspect, the present disclosure relates to a system for implementing continuous synchronization of personal information management (PIM) between a host desktop computer and a client wireless handheld device via a wireless network. The system comprises a host desktop computer having a desktop PIM database and operable to send a first PIM message via the wireless network to the client wireless handheld device, to receive a second PIM message from the client wireless handheld device via the wireless network and to update the desktop PIM database if the second PIM message is a non-email message. The system further comprises a client wireless handheld device having a handheld PIM database and a mirror database, operable to receive the first PIM message via the wireless network, to update the PIM database and mirror database according to the content of the first PIM message and to send the second PIM message via the wireless network.

Figure 1:
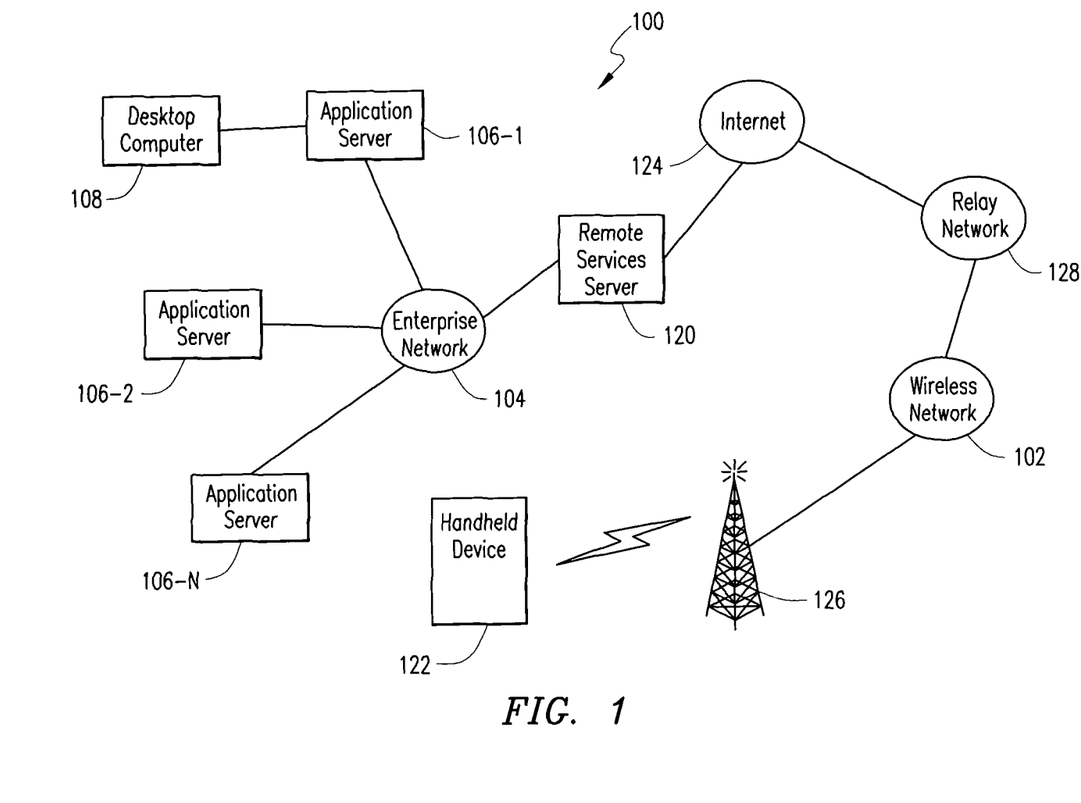
FIG. 1 shows an exemplary network environment including a host desktop computer and a client wireless handheld device wherein an embodiment of the present application may be practiced.

Referring initially to FIG. 1, depicted therein is an exemplary network environment 100 including a wireless packet data service network 102 wherein an embodiment of the present patent application may be practiced. An enterprise network 104, which may be a packet-switched network, can include one or more geographic sites and be organized as a local area network (LAN), wide area network (WAN), metropolitan area network (MAN) or the like for serving a plurality of corporate users. A number of application servers 106-1 through 106-N disposed as part of the enterprise network 104 are operable to provide or effectuate a host of internal and external services such as email, video mail, Internet access, corporate data access, messaging, calendaring and scheduling, information management and the like. Accordingly, a diverse array of personal information appliances such as desktop computers, laptop computers, palmtop computers and the like, which are generically and collectively referred to herein and depicted as desktop computer 108, may be operably networked to one or more of the application servers 106-i, where i=1, 2, ... , N, with respect to the services supported in enterprise network 104.

Additionally, a remote services server 120 may be interfaced with enterprise network 104 for enabling a corporate user to access or effectuate any of the services from a remote location using a suitable handheld device 122. A secure communication link with end-to-end encryption may be established that is mediated through an external IP network, i.e., a public packet-switched network such as the Internet 124, as well as the wireless packet data service network 102 operable with handheld device 122 via suitable wireless network infrastructure that includes a base station 126. In one embodiment, a trusted relay network 128 may be disposed between Internet 124 and the infrastructure of wireless packet data service network 102. By way of example, handheld device 122 may be a data-enabled handheld device capable of receiving and sending voice, text messages, web browsing, interfacing with corporate application servers and the like.

For purposes of the present patent application, the wireless packet data service network 102 may be implemented in any known or heretofore unknown mobile communications technologies and network protocols, as long as a packet-switched data service is available therein for transmitting packetized information. For instance, the wireless packet data service network 102 may be comprised of a General Packet Radio Service (GPRS) network that provides a packet radio access for mobile devices using the cellular infrastructure of a Global System for Mobile Communications (GSM)-based carrier network. In other implementations, the wireless packet data service network 102 may comprise an Enhanced Data Rates for GSM Evolution (EDGE) network, an Integrated Digital Enhanced Network (IDEN), a Code Division Multiple Access (CDMA) network, any 3rd Generation (3G) network or the like.

Figure 2:
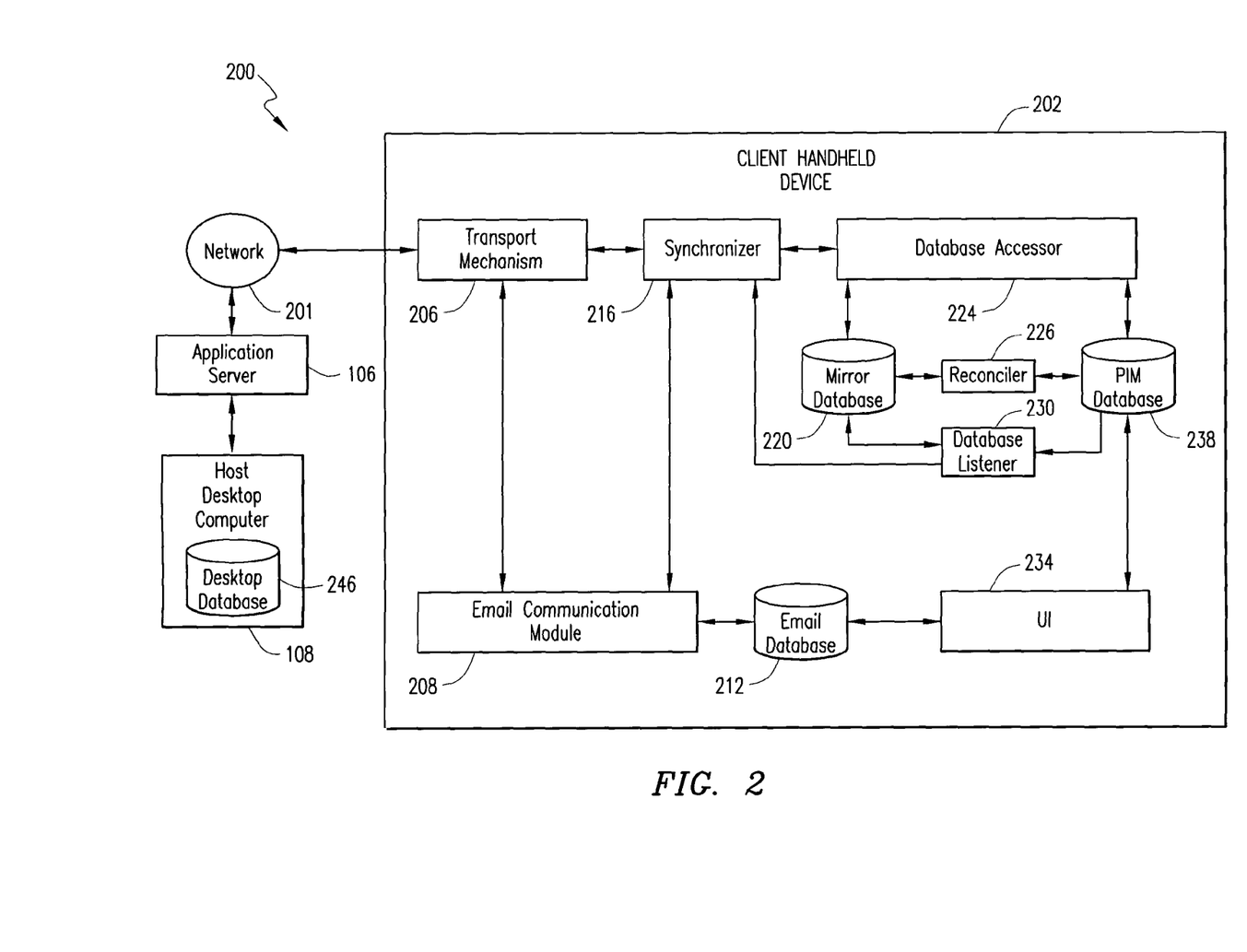
FIG. 2 shows a system for implementing continuous wireless synchronization of PIM applications between a host desktop computer and a client wireless handheld device according to an embodiment of the present application.

FIG. 2 shows a system for implementing continuous wireless synchronization of PIM applications between a host desktop computer and a client wireless handheld device according to an embodiment. Information is transferred between the desktop computer and the handheld device to update each immediately whenever there is a change occurred in the desktop computer or the handheld device. As shown in FIG. 2, the desktop computer 108, application server 106 are all similar to those of FIG. 1, and network 201 generally refers to enterprise network 104, remote services server 120, Internet 124, relay network 128, wireless network 102, and base station 126 as shown in FIG. 1. System 200 implements continuous synchronization of PIM applications between host desktop computer 108 and client wireless handheld device 202. Client handheld device 202 comprises the following modules: transport mechanism 206, synchronizer 216, database accessor 224, mirror database 220, PIM database 238, reconciler 226, database listener 230, email communication module 208, email database 212, and user interface (UI) 234. Client handheld device 202 preferably includes a microprocessor (not shown) which controls the overall operation of handheld device 202.

In the illustrated embodiment, desktop computer 108 is a host device, and handheld device 202 is a client device. Transport mechanism 206 is an interface between the host device and the client device. It handles network communication protocols such as packet assembling, disassembling, encryption, decryption, retry and etc. When a PIM message is sent from desktop computer 108, transport mechanism 206 receives the message and translates the message data from the data format of network 201 to the data format of handheld device 202. Similarly, when a PIM message is sent from handheld device 202, transport mechanism 206 translates the message data from the data format of handheld device 202 to the data format of network 201. Transport mechanism 206 sends a notification regarding a message coming from network 201 to synchronizer 216.

Synchronizer 216 initializes PIM applications and receives a message from transport mechanism 206 to verify if the message is valid or not. If the message is stale or conflicting, it is invalid. When a user sends a non-email message such as a calendar appointment from handheld device 202, synchronizer 216 controls the message to be transported through transport mechanism rather than email communication module 208. Similarly, when the user sends a non-email message such as a calendar appointment from desktop computer 108, synchronizer 216 controls the message to be transported from transport mechanism 206 to database accessor 224, mirror database 220, PIM database 238, and UI 234. When the user sends an email related message from desktop computer 108 or handheld device 202, such as a meeting request or a meeting response, synchronizer 216 controls the message to go through email communication module 208, and email database 212 and in addition to those modules for a non-email message.

When an email message such as a meeting request or a meeting response comes from desktop computer 108, appointment data is extracted from the email message and synchronizer 216 determines if the appointment data is valid. If the appointment data is valid, that is, the appointment data is not stale or conflicting, PIM database 238 and mirror database 220 are updated with the appointment data. Email communication module 208 stores the email message into email database 212 so that it may be displayed by UI 234. When an email message such as a meeting request or a meeting response is created on handheld device 202, synchronizer 216 may create a new email message according to the specified network protocol, store it into email database 212, and then attach appointment data to the new email message to send the message to transport mechanism 206.

Database accessor 224 accesses mirror database 220 and PIM database 238 to update the databases and synchronize them with desktop database 246 whenever there is a message from desktop computer 108. It also responds to any query of an entry in database and retrieves it from mirror database 220. PIM database 238 stores PIM message, and the change of a message may be displayed on UI 234. For example, PIM database 238 may be a calendar database for storing calendar entries. Any changes in the entries may be automatically reflected on UI 234. Mirror database 220 mirrors entries in the PIM database. It stores entries corresponding to entries in the PIM database and supplements it with additional information necessary for synchronization. Whenever there is a change in PIM database 238 from the handheld device 202, the change may be identified by comparing the contents of PIM database 238 and the contents of mirror database 220.

Reconciler 226 maintains mirror database 220 and PIM database 238 to be synchronized at start time of the system 200. Database listener 230 receives a notification with respect to any change in PIM database 238. Regarding any change notification it receives, database listener 230 compares the content of PIM database 238 with the content of mirror database 220 to identify what has changed, and confirm if the change is valid. If the change violates the protocol, the change is invalid. Otherwise, it is valid. Afterwards, the change information is passed to synchronizer 216 to send it to desktop computer 108 so as to synchronize to desktop computer 108.

Email database 212 stores email messages, meeting requests and meeting responses. Meeting requests and meeting responses of calendar applications are treated as email messages to send and receive. Appointment data are attached to the email messages. Email communication module 208 sends and receives emails. Email communication module 208 receives a meeting request or a meeting response as an email from network 201 and stores it into email database 212. UI 234 is an interface between handheld device 202 and a user. UI 234 retrieves data from PIM database 238 and email database 212 for display, and writes data to PIM database 238 for any PIM change made on handheld device 202. PIM data in this embodiment may be calendar, contacts, tasks, memos or the like.

Figure 3:
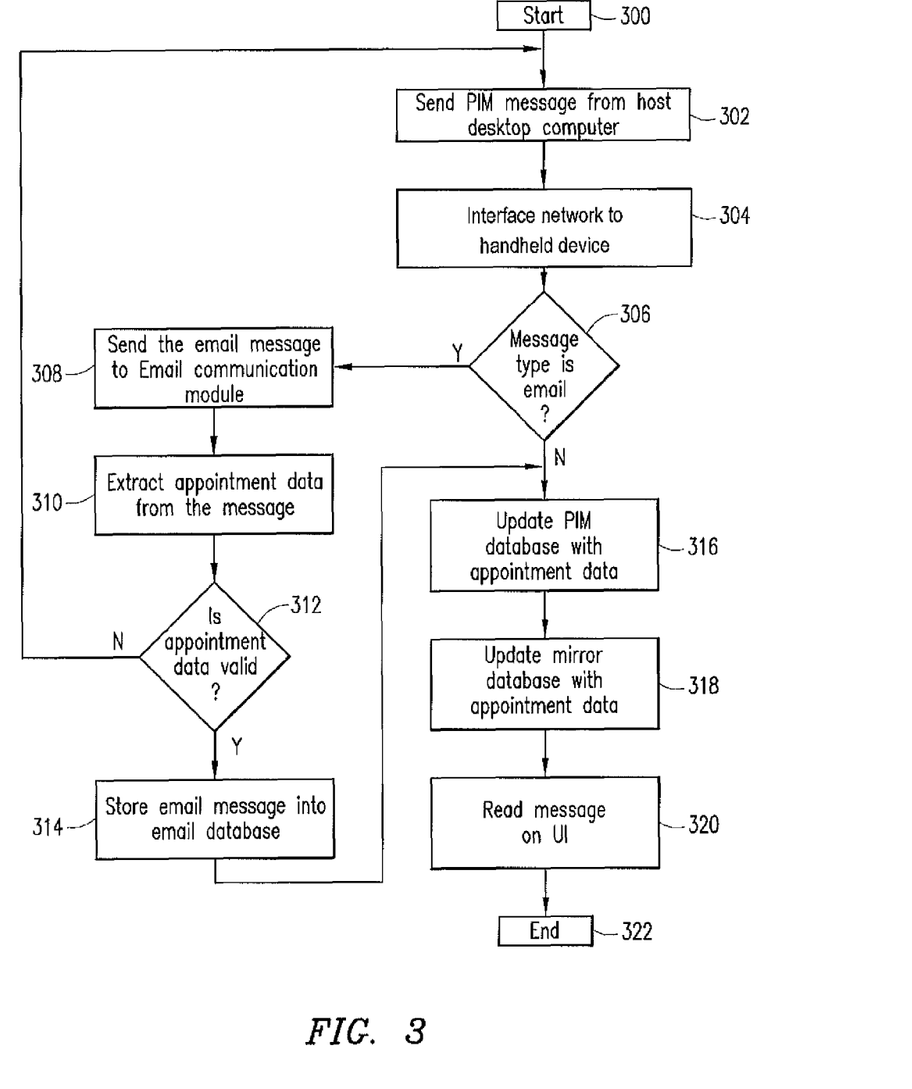
FIG. 3 shows a flowchart showing an embodiment of a method to implement continuous wireless synchronization of PIM applications from a host desktop computer to a client wireless handheld device.

FIG. 3 shows a flowchart showing an embodiment of a method to implement continuous wireless synchronization of PIM applications from a host desktop computer to a client wireless handheld device. The process starts at block 300 and proceeds to step 302, where a PIM message is sent from host computer 108. This will generally occur when a user creates a PIM entry, such as a calendar entry, on a host desktop computer 108 and stores it into desktop database 246. At step 304, the transport mechanism 206 performs an interface process from network 201 to handheld device 202. Transport mechanism 206 receives the PIM message from network 201 according to network communication protocols such as packet assembling, disassembling, encryption, decryption, retry or the like, translates the PIM message data from the data format of network 201 to the data format of handheld device 202, and sends a notification regarding a message coming from network 201 to synchronizer 216. The data format of network 201 may, for example, be ASCII string format. The data format of handheld device 202 may, for example, be Windows CE data format.

Synchronizer 216 receives the notification and determines the type of the message at step 306. If the message is not an email message, process flow proceeds directly to step 316. If the message is an email message such as a meeting request or a meeting response, the process proceeds to step 308 where the message is sent to email communication module 208 from transport mechanism 206. Email communication module 208 then extracts appointment data from the message at step 310.

Synchronizer 216 determines whether the appointment data is valid at step 312. If the appointment data is not valid for some reason, for example, the appointment data is stale or conflicting with an existing appointment data, then the appointment data is rejected and the process returns to step 302, where the user sends an another message such as a meeting request or a meeting response. If the appointment data is valid, synchronizer 216 stores the email message into email database 212 at step 314 for displaying on UI 234. The process then proceeds to step 316, where PIM database 238 is updated with the valid appointment data. Mirror database 220 is updated with the valid appointment data at step 318, and then the message is read by means of UI 234.

If the message type is not an email message, for example, the message is an appointment data; PIM database 238 and mirror database 220 are updated with the appointment data subsequently at 316 and 318, and the appointment data is read on UI at 318.

It is clear from the above process that a message is synchronized from desktop database 246 of desktop computer 108 to PIM database 238 of handheld device 202 as soon as the message is created and sent from desktop computer 108. The user may read the message from UI 234. The PIM message in this embodiment refers to calendar, contacts, tasks, memos or the like.

For the calendar application, the PIM message may be the creation of a new record, an update to an existing record or a deletion to an existing record. A calendar record may be an appointment, a meeting request or a meeting response. A meeting request or a meeting response is an email message attached with appointment data.

Figure 4:
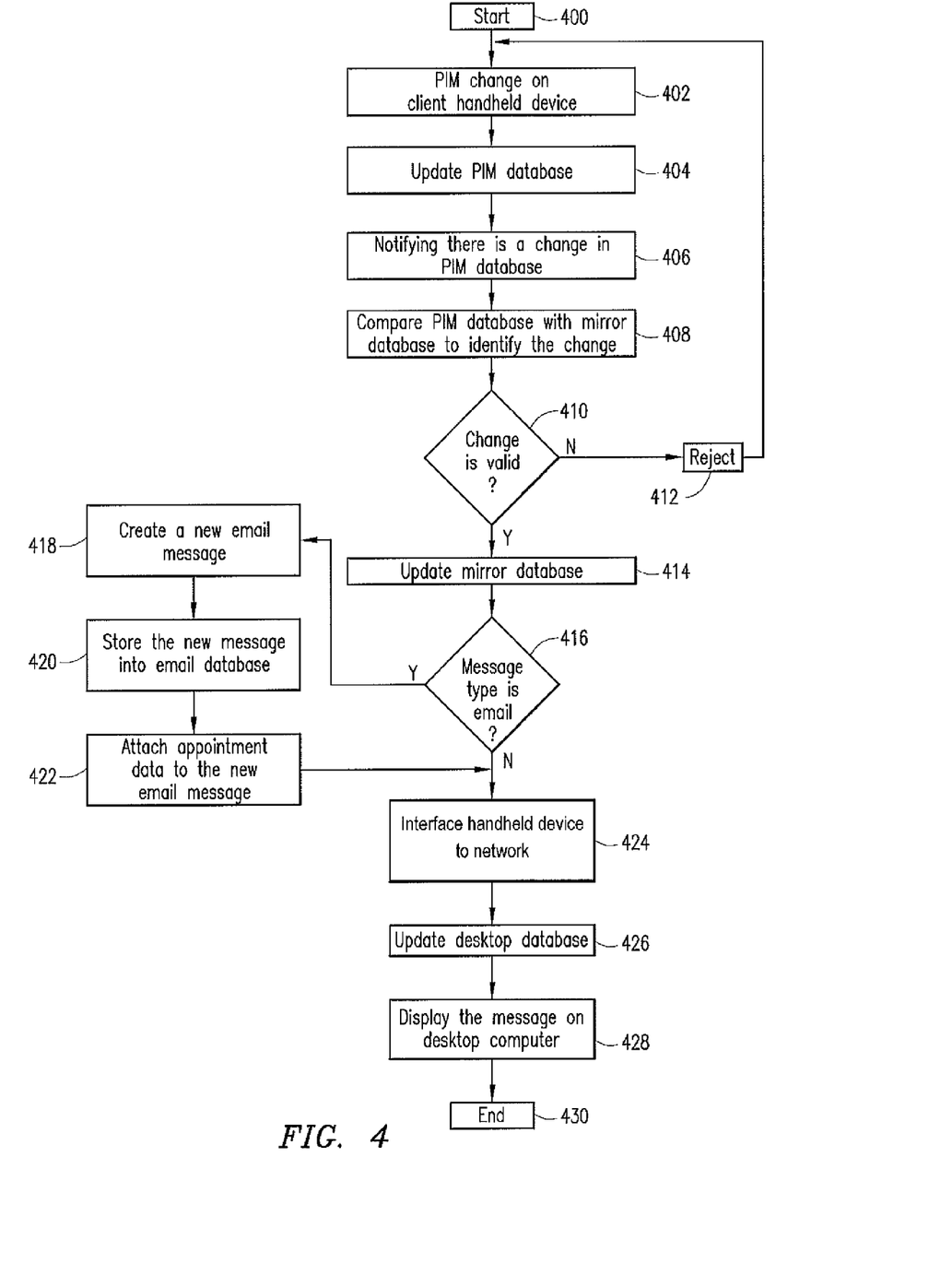
FIG. 4 shows a flowchart showing another embodiment of a method to implement continuous wireless synchronization of PIM applications to a host desktop computer from a client wireless handheld device.

The following will describe a continuous synchronization of PIM message from a handheld device with reference to FIG. 4. FIG. 4 shows a flowchart showing another embodiment of a method to implement continuous wireless synchronization of PIM applications to a host desktop computer from a client wireless handheld device.

The process starts in block 400 and proceeds to step 402, where a PIM change is made. This may occur, for example, where a user makes a PIM change such as a calendar entry by means of UI 234 of handheld device 202, and saves the PIM change to PIM database 238. PIM database 238 is updated at step 404. At step 406, PIM database 238 sends a notification there is a change in PIM database 238. The database listener 230 receives the notification and compares the content of PIM database with the content of mirror database to identify what change has been done at step 408. In step 410, it is determined whether the change is valid. If the change is invalid, the message is rejected at 412 and process flow returns to step 402 for the user to create another change. If the change is valid, then mirror database 220 is updated with the change at 414. The change may be, for example, the appointment data coming from handheld device 202.

The process proceeds to step 416, where the type of the message is determined by synchronizer 216. If the message is not an email message, process flow proceeds directly to step 424, described below. If the message is an email message, such as a meeting request or a meeting response, the process goes to step 418 where a new email message is created by synchronizer 216, and at step 420, the new email message stores into email database 212. At step 422, the synchronizer 216 attaches the appointment data identified by database listener 230 at step 408 to the new email message and sends the new email message attached with the appointment data to transport mechanism 206. The process then proceeds to step 424.

At step 424, the system performs an interface process between handheld device 202 and network 201. Transport mechanism 206 translates the message data format from the data format of handheld device 202 to the data format of network 201 and sends the message to network 201 according to communication protocols such as packet assembling, disassembling, encryption, decryption, retry or the like, and desktop computer 108 extracts the appointment data and updates desktop database 246 with the appointment data at 426. The message is displayed on desktop computer at step 428. Process flow ends in block 430.

The above process illustrates that a message is synchronized from PIM database 238 of handheld device 202 to desktop database 246 of desktop computer 108 as soon as the message is created and sent from handheld device 202. The PIM message in this embodiment refers to calendar, contacts, tasks, memos or the like. For the calendar application, the PIM message may be the creation of a new record, an update to an existing record, or a deletion to an existing record. A meeting request or a meeting response is an email message attached with appointment data. Continuous synchronization of PIM applications between host desktop computer 108 and client handheld device 202 is implemented by means of the processes as shown in FIG. 3 and FIG. 4.

Figure 5:
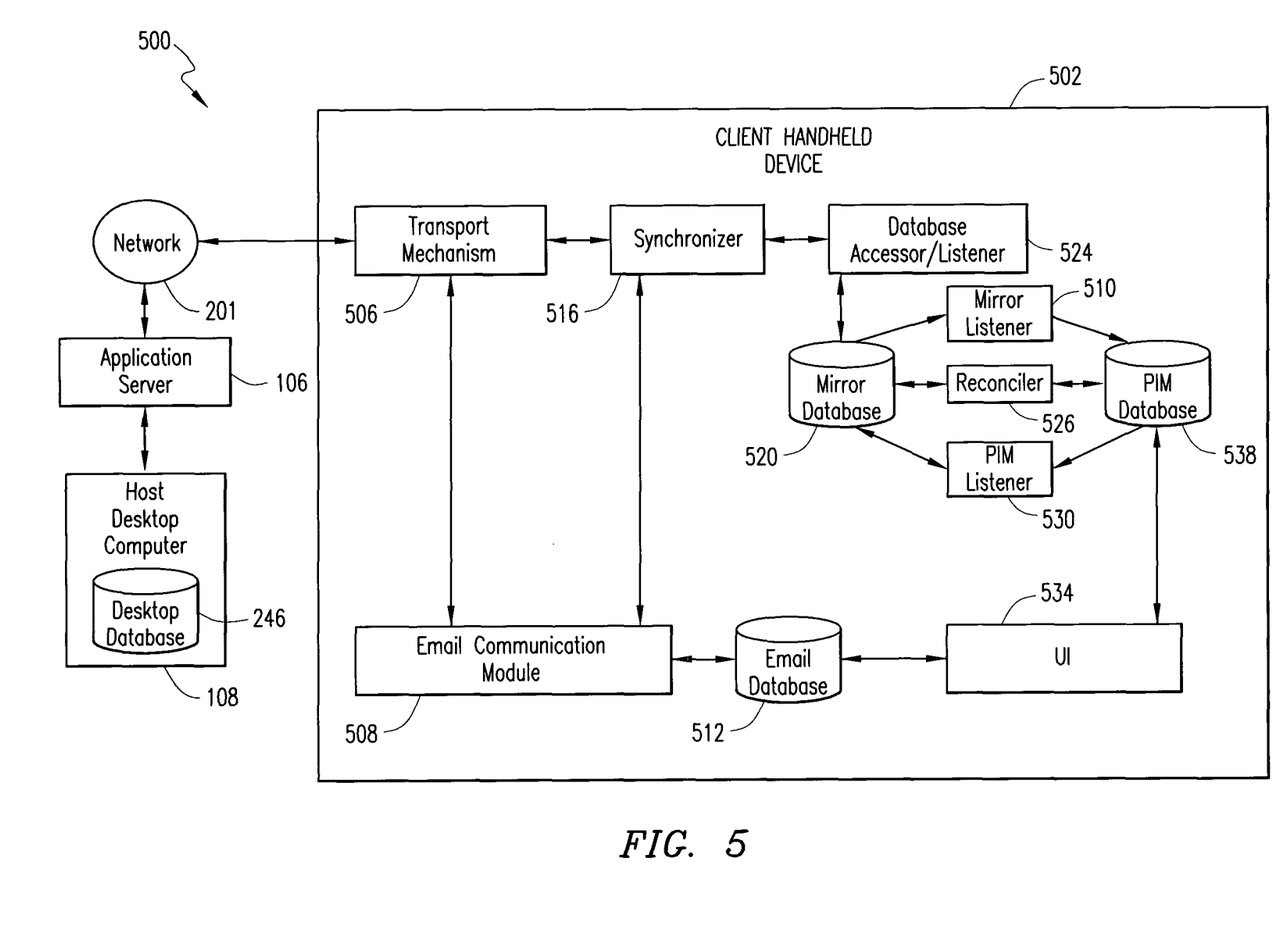
FIG. 5 shows a system for implementing continuous wireless synchronization of PIM applications between a host desktop computer and a client wireless handheld device according to an additional embodiment of the present application.

FIG. 5 shows an additional embodiment of a system for implementing continuous wireless synchronization of PIM applications between a host desktop computer and a client wireless handheld device. Information is transferred between the host desktop computer 108 and the client handheld device 502 to update each immediately whenever there is a change in the host desktop computer 108 or the client handheld device 502.

As shown in FIG. 5, the host desktop computer 108 and application server 106 are similar to those of FIGS. 1 and 2. Network 201 generally refers to enterprise network 104, remote services server 120, Internet 124, relay network 128, wireless network 102, and base station 126 as shown in FIG. 1. System 500 implements continuous synchronization of PIM applications between host desktop computer 108 and client wireless handheld device 502. Client handheld device 502 comprises the following modules: transport mechanism 506, mirror listener 510, synchronizer 516, database accessor/listener 524, mirror database 520, PIM database 538, reconciler 526, PIM listener 530, email communication module 508, email database 512, and user interface (UI) 534. Client handheld device 502 preferably includes a microprocessor (not shown) which controls the overall operation of handheld device 502.

In the illustrated embodiment, desktop computer 108 is a host device, and handheld device 502 is a client device. Transport mechanism 506 is an interface between the host device 108 and the client device 502. It handles network communication protocols such as packet assembling, disassembling, encryption, decryption, retry and etc. When a PIM message is sent from host desktop computer 108, transport mechanism 506 receives the message and translates the message data from the data format of network 201 to the data format of client handheld device 502. Similarly, when a PIM message is sent from client handheld device 502, transport mechanism 506 translates the message data from the data format of handheld device 502 to the data format of network 201. Transport mechanism 506 sends a notification regarding a message coming from network 201 to synchronizer 516.

Synchronizer 516 initializes PIM applications and receives a message from transport mechanism 506 to verify if the message is valid or not. If the message is stale or conflicting, it is invalid. When a user sends a non-email message such as a calendar appointment from handheld device 502, synchronizer 516 directs the message through transport mechanism 506 rather than email communication module 508. Similarly, when the user sends a non-email message such as a calendar appointment from desktop computer 108, synchronizer 516 controls the message to be transported from transport mechanism 506 to database accessor/listener 524, mirror database 520, PIM database 538 and UI 534. When the user sends an email related message from host desktop computer 108 or handheld device 502, such as a meeting request or a meeting response, synchronizer 516 directs the message through email communication module 508, email database 512 and UI 534.

When an email message such as a meeting request or a meeting response comes from host desktop computer 108, appointment data is extracted from the email message and synchronizer 516 determines if the appointment data is valid. If the appointment data is valid, that is, the appointment data is not stale or conflicting, PIM database 538 and mirror database 520 are updated with the appointment data. Email communication module 508 stores the email message in email database 512 so that it may be displayed by UI 534.

When an email message such as a meeting request or a meeting response is created on handheld device 502, synchronizer 516 may create a new email message according to the specified network protocol, store it into email database 512, and then attach appointment data to the new email message to send the message to transport mechanism 506.

Database accessor/listener 524 accesses mirror database 520 in order to update and synchronize it with desktop database 246 whenever there is a message from host desktop computer 108 or whenever there is a PIM change from handheld device 502. It also responds to any database query and retrieves the requested information from mirror database 520. PIM database 538 stores PIM messages, and the change of the message is displayed on UI 534. For example, it may be a calendar database storing calendar entries. Any changes in the entries get automatically reflected on UI 534. Mirror database 520 mirrors the entries in the PIM database 538. It keeps entries corresponding to the entries in the PIM database 538 and supplements it with any additional information necessary for synchronization. Whenever there is a change in the PIM database 538 initiated from the client handheld device 502, the change may be identified by comparing the contents of PIM database 538 and the contents of mirror database 520.

Reconciler 526 maintains mirror database 520 and PIM database 538 to be synchronized at start time of the system 500. PIM listener 530 receives a notification from PIM database 538 whenever there is a change in PIM database 538. Regarding any change notification it receives, PIM listener 530 updates mirror database 520.

Email database 512 stores email messages, meeting requests and meeting responses. Meeting requests and meeting responses of calendar applications are treated as email messages to send and receive. Appointment data are attached to the email messages. Email communication module 508 sends and receives emails. Email communication module 508 receives a meeting request or a meeting response as an email from network 201 and stores it into email database 512.

UI 534 is an interface between client handheld device 502 and user. It reads data from PIM database 538 and email database 512 for displaying a PIM message, and writes data to PIM database 538 for any PIM change made on handheld device 502. PIM data in this embodiment may be calendar entries, contacts, tasks, memos or the like.

Although those of skill will recognize that the structure of client handheld device 502 is similar in many respects to client handheld device 202 of FIG. 2, those of skill in the art will also recognize a number of distinctions between the two. Mirror Listener 510 listens for any changes in mirror database 520 and propagates any such changes to the PIM database 538. This function is similar to the function performed by the database accessor 224 of FIG. 2. In contrast to database accessor 224 of FIG. 2, however, database accessor/listener 524 does not update the PIM database 538. Database accessor/listener 524 interacts with mirror database 520 only and saves any updates coming from the synchronizer 516 to mirror database 520. Database accessor/listener 524 also listens for any changes in the mirror database 520 and communicates any such changes to synchronizer 516.

Those of skill in the art will appreciate that the foregoing disclosure includes a variety of aspects and embodiments. According to a further aspect, the present disclosure relates to a method for implementing continuous synchronization of personal information management (PIM) applications between a host desktop computer and a client wireless handheld device. The method comprises sending a PIM message from the host desktop computer to the client wireless handheld device via a wireless network, receiving the PIM message in the client wireless handheld device, translating the PIM message from network data format into handheld data format, determining the type of the PIM message, updating a PIM database with the PIM message if the PIM message is a non-email message and updating a mirror database with the PIM message. The PIM database stores every PIM message entry, while the mirror database stores a mirror image of every PIM message entry in the PIM database along with information for synchronizing the host desktop computer with the client wireless handheld device.

According to certain embodiments, the method further comprises extracting appointment data if the PIM message is an email message, determining if the appointment data is valid, storing the email message into an email database if the appointment data is valid, updating the PIM database with the appointment data and updating the mirror database with the appointment data.

According to a further embodiment, the present disclosure relates to a method for implementing continuous synchronization of personal information management (PIM) applications between a host desktop computer and a client wireless handheld device. The method comprises sending a PIM message from the client wireless handheld device, updating a PIM database, notifying there is a change in the PIM database, comparing the contents of the PIM database and the contents of a mirror database, identifying the change information in the PIM database, updating a mirror database based on the change information, determining the type of the PIM message, translating the change information from handheld data format into network data format if the PIM message is a non-email message, sending the change information from the client wireless handheld device to the host desktop computer via a wireless network, updating a desktop database of the host desktop computer based on the change information. The PIM database stores every PIM message entry, while the mirror database stores a mirror image of every PIM message entry in the PIM database along with additional information for synchronizing between the host desktop computer and the client wireless handheld device.

In one aspect, the method further comprises creating a new email message if the PIM message is the email message, storing the new email message into an email database, attaching appointment data identified from the change information to the new email, translating the new email message attached with appointment data from handheld data format into network data format, sending the new email message attached with appointment data from the client wireless handheld device to the host desktop computer via a wireless network, updating a desktop database of the host desktop computer based on the appointment data, and displaying the new email message attached with appointment data.

According to a further embodiment, the present disclosure relates to a system for implementing continuous synchronization of personal information management (PIM) applications between a host desktop computer and a client wireless handheld device. The system comprises a host desktop computer having a desktop database for creating a first PIM message and sending the first PIM message from the host desktop computer via a wireless network to the client wireless handheld device, and receiving a second PIM message resulted from a PIM change from the client wireless handheld device and updating the desktop database based on the change information if the second PIM message is an non-email message, a wireless network communicably linked to the host desktop computer, a client wireless handheld device communicably linked to the wireless network, the client wireless handheld device including an interface mechanism for receiving the first PIM message and sending the second PIM message according to network communication protocols and translating the first second PIM from handheld data format into network data format if the second message is an non-email message, a synchronizer for determining the validity of the first PIM message from the host desktop computer and the validity of the second PIM message, determining the types of the first PIM message and the second PIM message, a PIM database for storing first PIM message from the host desktop computer and the PIM change from the client wireless handheld device, a mirror database for storing a mirror image of every message in the PIM database and additional information for synchronizing the host desktop computer with the client wireless handheld device, and updating means for updating the PIM database and the mirror database based on the first PIM message from the host desktop computer, and updating the PIM database and mirror database based on the PIM change from the client wireless handheld device.

In one aspect, the synchronizer creates a new email message if the second PIM message is an email message, and attaches appointment data to the new email message. The system may further comprise an email communication module for receiving the first PIM message from the interface mechanism if the type of the first PIM message is an email message and for sending the new email message attached with the appointment data if the second PIM message is an email message, and an email database for saving the email message from the host desktop computer and the email message from the client wireless handheld device. The interface mechanism translates the new message attached with the appointment data from handheld data format into network data format, and the desktop computer extracts the appointment data and updates the desktop database.

While this application has described a wireless network with reference to illustrative embodiments, this description is not intended to be construed in a limiting sense. Various modifications and combinations of the illustrative embodiments as well as other embodiments of the mobile device, will be apparent to persons skilled in the art upon reference to the description. It is, therefore, intended that the appended claims encompass any such modifications or embodiments.

What is claimed is:

1. A method for implementing continuous wireless synchronization of a personal information management (PIM) database disposed on a wireless handheld device with a remote PIM database disposed on a host computer, the method comprising:
  responsive to receiving, at a PIM listener on the wireless handheld device, a notification with respect to a change in the PIM database, comparing the content of the PIM database to a mirror database on the wireless handheld device to identify the change; changing the mirror database according to the identified change and providing the identified change to a synchronizer on the wireless handheld device that pushes the identified change to the remote PIM database via a wireless network in order to update the remote PIM database; and responsive to receiving at the wireless handheld device, via the wireless network, a PIM message indicating a change in PIM data in the remote PIM database, changing, according to the content of the PIM message, PIM data in the mirror database disposed on the wireless handheld device and a mirror listener listens for the change in mirror database and propagates the change in the mirror database to the PIM database.

2. The method of claim 1, further comprising:
extracting appointment data from the PIM message if the PIM message is an email message;
determining if the appointment data conflicts with an existing appointment;
storing the email message into an email database if the appointment data does not conflict with an existing appointment;
updating the handheld PIM database with the appointment data, and
updating the handheld mirror database with the appointment data.

3. The method of claim 1, wherein the identified change relates to one of: creation of a calendar record, an update to a calendar record and deletion of a calendar record.

4. The method of claim 3, wherein the calendar record is an appointment record.

5. The method of claim 3, wherein the calendar record is a meeting request record.

6. The method of claim 3, wherein the calendar record is a meeting response record.

7. The method of claim 1, wherein the identified change relates to one of: creation of a contacts record, an update to a contacts record and deletion of a contacts record.

8. The method of claim 1, wherein the identified change relates to one of a creation of a tasks record, an update to a tasks record and a deletion of a tasks record.

9. The method of claim 1, wherein the identified change relates to one of a creation of a memos record, an update to a memos record and a deletion of a memos record.

10. A method for continuously updating, via a wireless network, personal information management (PIM) databases disposed on a wireless handheld device with a PIM database on a host computer, the method comprising:
responsive to a PIM listener on the wireless handheld device receiving a notification with respect to a change in the PIM database by a user of the handheld device, comparing the content of the PIM database to a mirror database on the wireless handheld device to identify the change, changing the mirror database according to the identified change and cause the identified change to be forwarded to the remote PIM database via the wireless network in order to update the remote PIM database; and
responsive to receiving at the wireless handheld device, via the wireless network, a message from the host computer containing appointment data, extracting appointment data from the message, determining whether the extracted appointment data conflicts with prior appointments in the mirror database disposed on the wireless handheld device, storing non-conflicting appointment data in the mirror database, and a mirror listener listens for the change in mirror database and propagates the change in the mirror database to the PIM database.

11. A wireless handheld device operable to implement continuous wireless synchronization of personal information management (PIM) databases disposed on the wireless handheld device with a remote PIM database disposed on a host computer, the device comprising:

a PIM database disposed on the wireless handheld device and having PIM data stored therein;
a mirror database disposed on the wireless handheld device and having PIM data stored therein;
a PIM listener that receives a notification with respect to a change to the PIM database on the wireless handheld device by a user of the wireless handheld device, compares the content of the PIM database to the mirror database to identify the change, causes the mirror database to be updated according to the identified change; and
a database accessor that forwards the identified change to a synchronizer that pushes the identified change to the remote PIM database via a wireless network so that the remote PIM database is updated;
wherein, when a PIM message indicating a change in PIM data in the remote PIM database is received at the wireless handheld device via the wireless network, the synchronizer causes the PIM data in the mirror database to be updated according to the content of the PIM message and a mirror listener listens for the change in mirror database and propagates the change in the mirror database to the PIM database.

12. The wireless handheld device of claim 11, further comprising:
means for extracting appointment data from the PIM message if the PIM message is an email message;
means for determining if the appointment data conflicts with an existing appointment;
means for storing the email message into an email database if the appointment data does not conflict with an existing appointment;
means for updating the handheld PIM database with the appointment data, and
means for updating the handheld mirror database with the appointment data.

13. The wireless handheld device of claim 11, wherein the identified change relates to one of: creation of a calendar record, an update to a calendar record and deletion of a calendar record.

14. The wireless handheld device of claim 13, wherein the calendar record is an appointment record.

15. The wireless handheld device of claim 13, wherein the calendar record is a meeting request record.

16. The wireless handheld device of claim 13, wherein the calendar record is a meeting response record.

17. The wireless handheld device of claim 11, wherein the identified change relates to one of: creation of a contacts record, an update to a contacts record and deletion of a contacts record.

18. The wireless handheld device of claim 11, wherein the identified change relates to one of a creation of a tasks record, an update to a tasks record and a deletion of a tasks record.

19. The wireless handheld device of claim 11, wherein the identified change relates to one of a creation of a memos record, an update to a memos record and a deletion of a memos record.

20. A wireless handheld device for continuously synchronizing, via a wireless network, a personal information management (PIM) database disposed on the wireless handheld device with a PIM database on a host computer, the wireless handheld device comprising:
a PIM database disposed on the wireless handheld device and having PIM data stored therein;
a mirror database disposed on the wireless handheld device and having the PIM data stored therein;

a PIM listener that receives a notification with respect to a change to appointment data on the wireless handheld device by a user of the wireless handheld device, compares the content of the PIM database to the mirror database to identify the change, causes the mirror database to be updated with the identified change; and a database accessor that forwards the identified change to a synchronizer that pushes the identified change to the remote PIM database via the wireless network so that the remote PIM database is updated;

wherein, when a message received from the host computer via the wireless network is an email message containing appointment data, the synchronizer extracts appointment data from the message determines whether the extracted appointment data conflicts with prior appointments in the mirror database, and a mirror listener listens for the change in mirror database and propagates the change in the mirror database to the PIM database.

* * * * *